(12) United States Patent
Vaishnavi

(10) Patent No.: US 12,009,963 B2
(45) Date of Patent: *Jun. 11, 2024

(54) METHOD AND SYSTEM FOR DISABLING OR ENABLING CONTROL LOOP DECISIONS

(71) Applicant: Lenovo (Singapore) Pte. Ltd., New Tech Park (SG)

(72) Inventor: Ishan Vaishnavi, Munich (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/014,962

(22) PCT Filed: Jul. 8, 2021

(86) PCT No.: PCT/IB2021/056158
§ 371 (c)(1),
(2) Date: Jan. 6, 2023

(87) PCT Pub. No.: WO2022/009153
PCT Pub. Date: Jan. 13, 2022

(65) Prior Publication Data
US 2023/0261925 A1 Aug. 17, 2023

Related U.S. Application Data

(60) Provisional application No. 63/050,027, filed on Jul. 9, 2020.

(51) Int. Cl.
*H04L 41/0213* (2022.01)
*H04L 41/5067* (2022.01)

(52) U.S. Cl.
CPC ...... *H04L 41/0213* (2013.01); *H04L 41/5067* (2013.01)

(58) Field of Classification Search
None
See application file for complete search history.

(56) References Cited

U.S. PATENT DOCUMENTS

| 6,173,346 B1 | 1/2001 | Wallach et al. |
| 7,409,482 B2 * | 8/2008 | Olsen .................... H04L 63/102 709/225 |

(Continued)

FOREIGN PATENT DOCUMENTS

EP 2490088 A2 8/2012

OTHER PUBLICATIONS

PCT/IB2021/056158, "Notification of Transmittal of the International Search Report and the Written Opinion of the International Searching Authority, or the Declaration", International Searching Authority, dated Sep. 14, 2021, pp. 1-19.

(Continued)

*Primary Examiner* — Ranodhi Serrao
(74) *Attorney, Agent, or Firm* — Kunzler Bean & Adamson

(57) ABSTRACT

A method for disabling/enabling control loop decisions is disclosed includes, in various examples, receiving a request from a consumer to disable or enable control loop decisions for managed entities from being selected by control loops or entities therein; determining whether the request is performable by the control loops or entities therein; and disabling or enabling an ability to select the control loop decisions on the managed entities by the control loops or entities therein in response to determining that the request is currently applicable and performable. A system may perform the method. In some examples, the method disables one or more second control loops/entities from selecting decisions that conflict with decisions selected by a first control loop.

20 Claims, 11 Drawing Sheets

Sequence Diagram For Disabling Or Enabling Control Loop Decisions

(56) References Cited

U.S. PATENT DOCUMENTS

| | | | | |
|---|---|---|---|---|
| 8,613,000 | B2* | 12/2013 | Liu | G06F 9/45537 |
| | | | | 718/1 |
| 9,979,799 | B2* | 5/2018 | Kochar | H04L 41/082 |
| 10,419,267 | B2* | 9/2019 | Basso | H04L 41/046 |
| 2008/0276258 | A1* | 11/2008 | Liu | G06F 9/45537 |
| | | | | 718/1 |
| 2012/0215326 | A1* | 8/2012 | Brown | G05B 19/0426 |
| | | | | 700/42 |
| 2014/0136215 | A1* | 5/2014 | Dai | G10L 15/22 |
| | | | | 704/275 |
| 2015/0081043 | A1 | 3/2015 | Kim et al. | |
| 2016/0191305 | A1* | 6/2016 | D'Souza | H04L 12/1442 |
| | | | | 709/226 |
| 2019/0321973 | A1 | 10/2019 | Meier et al. | |
| 2020/0014581 | A1* | 1/2020 | Aaron | H04L 41/40 |
| 2023/0246900 | A1* | 8/2023 | Zhang | H04W 24/02 |
| | | | | 709/223 |
| 2023/0261946 | A1* | 8/2023 | Vaishnavi | H04L 41/40 |
| | | | | 709/223 |

OTHER PUBLICATIONS

ETSI, "Zero-touch network and Service Management (ZSM); Reference Architecture", ETSI GS ZSM 002 V1.1.1, Aug. 2019, pp. 1-80.

ETSI, "Zero-touch network and Service Management (ZSM); Terminology for concepts in ZSM", ETSI GS ZSM 007 V1.1.1, Aug. 2019, pp. 1-11.

ETSI, "Zero-touch network and Service Management (ZSM); Closed-Loop Automation; Part 1: Enablers", ETSI GS ZSM 009-1 V1.1.1, Jun. 2021, pp. 1-40.

Sakata et al., "Evaluation of assurance closed loop PoC for achieving scheduled maintenance in telecommunication carrier networks", IEICE, Sep. 18, 2019, pp. 1-4.

ETSI, "Proposed Addition of Communication Pattern Options", ENI(20)014_043r1, Jun. 19, 2020, pp. 1-8.

3GPP, "3rd Generation Partnership Project; Technical Specification Group Services and System Aspects; Management and orchestration; Study on enhancement of Management Data Analytics (MDA) (Release 17)", 3GPP TR 28.809 V0.4.0, Jun. 2020, pp. 1-49.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Management and orchestration; Provisioning; (Release 16)", 3GPP TS 28.531 V16.5.0, Mar. 2020, pp. 1-71.

3GPP, "3rd Generation Partnership Project; Technical Specification Group Services and System Aspects; Management and orchestration; Management services for communication service assurance; Requirements (Release 16)", 3GPP TS 28.535 V2.0.0, Jun. 2020, pp. 1-16.

3GPP, "3rd Generation Partnership Project; Technical Specification Group Services and System Aspects; Management and orchestration; Management Services for Communication Service Assurance; Stage 2 and stage 3 (Release 16)", 3GPP TS 28.536 V0.4.0, Jun. 2020, pp. 1-19.

KBR, "Versatile Autmated Micro Rector System for Catalyst Evaluation", ip.com IPCOM000218593D, Jun. 15, 2012, pp. 1-14.

* cited by examiner

Logical Representation Of Management Domains

Example Deployment Scenario Of Management Domains

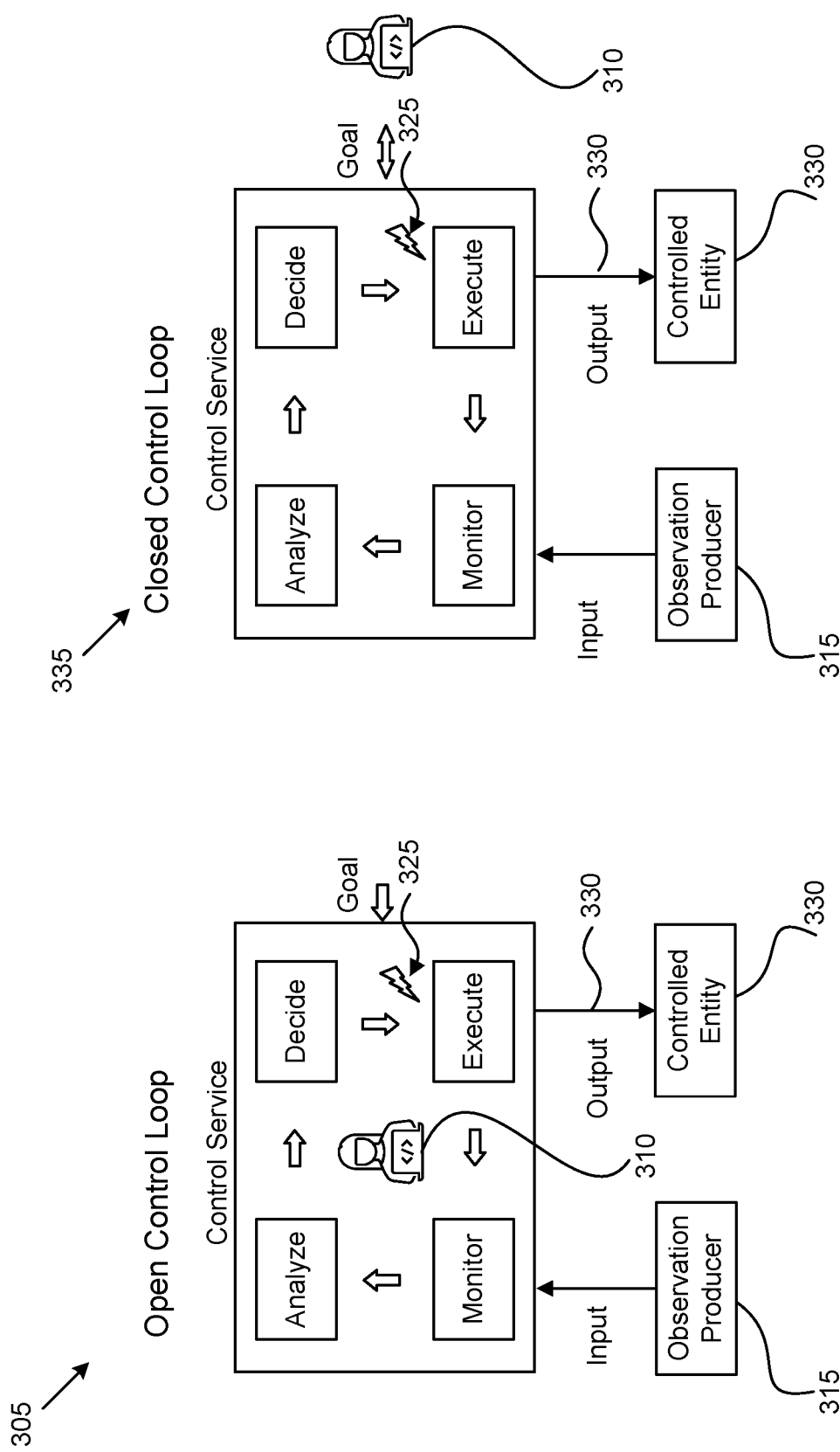

SA5-based example of disabling decisions for a control loop

METHOD AND SYSTEM FOR DISABLING OR ENABLING CONTROL LOOP DECISIONS

CROSS-REFERENCE TO RELATED APPLICATIONS

This application claims priority to U.S. Provisional Patent Application No. 63/050,027 titled "METHOD AND SYSTEM FOR DISABLING OR ENABLING CONTROL LOOP DECISIONS" and filed on Jul. 9, 2020, for Ishan Vaishnavi, which is incorporated herein by reference to the extent permitted under applicable patent law and rules.

FIELD

The subject matter disclosed herein relates generally to enhanced management of control loops in wireless communications and more particularly relates to a method and entity (e.g., an apparatus and/or a system) for disabling or enabling control loop decisions.

BACKGROUND

In certain wireless communications networks, control loop decisions may be produced by one or more control loops or entities within the one or more control loops. Such decisions or action plans selected at the decision stage of a control loop may be executed by one or more corresponding actions and/or configurations executed at the execute stage of the control loop.

BRIEF SUMMARY

Disclosed are a system and a method for disabling or enabling control loop decisions. Control closed loops may exist across management domains. Control loops often consist of a decision-making part where certain decisions can be made by a control loop regarding the managed entity the control loop acts on. Different management services as the decision part of control loops or entities with control loops in different management domains may be working on different entities or parts of the same End-to-end (E2E) service or E2E slice and may select independent decisions. This has the possibility of resulting in inefficient (conflicting or ineffective) decisions (e.g., action plans) being taken/produced by closed control loops deciding on different parts of the managed entity.

A system for disabling or enabling control loop decisions is disclosed that, according to one or more examples of the present disclosure, includes a decision management service producer associated with one or more control loops running in one or more management domains of a mobile network, the decision management service producer including a processor, memory, and program code operable to receive a request from a consumer of the decision management service producer to disable or enable one or more decisions for one or more managed entities from being selected by the one or more control loops or by one or more entities within the one or more control loops. The program code is further operable to determine whether the request to disable or enable the one or more decisions is currently applicable to the one or more managed entities and is performable by the one or more control loops or entities therein and to disable or enable an ability to select the one or more decisions on the one or more managed entities by the one or more control loops or one or more entities within the one or more control loops in response to determining that the request is currently applicable and performable.

A method for disabling or enabling control loop decisions is disclosed that, according to one or more examples of the present disclosure, includes receiving a request from a consumer of a decision management service producer to disable or enable one or more control loop decisions for one or more managed entities from being selected by one or more control loops or by one or more entities within the one or more control loops. In various examples, the method further includes determining whether the request to disable or enable the one or more decisions is currently applicable to the one or more managed entities and is performable by the one or more control loops or entities therein and disabling or enabling an ability to execute the one or more control loop decisions on the one or more managed entities by the one or more control loops or one or more entity within the one or more control loops in response to determining that the request is currently applicable and performable.

BRIEF DESCRIPTION OF THE DRAWINGS

A more particular description of the examples briefly described above will be rendered by reference to specific examples that are illustrated in the appended drawings. Understanding that these drawings depict only some examples and are not, therefore, to be considered to be limiting of scope, the examples will be described and explained with additional specificity and detail through the use of the accompanying drawings, in which:

FIG. 3A is a diagram depicting an open control loop according to one or more examples of the present disclosure;

FIG. 3B is a diagram depicting a closed control loop according to one or more examples of the present disclosure;

DETAILED DESCRIPTION

Figure 1:
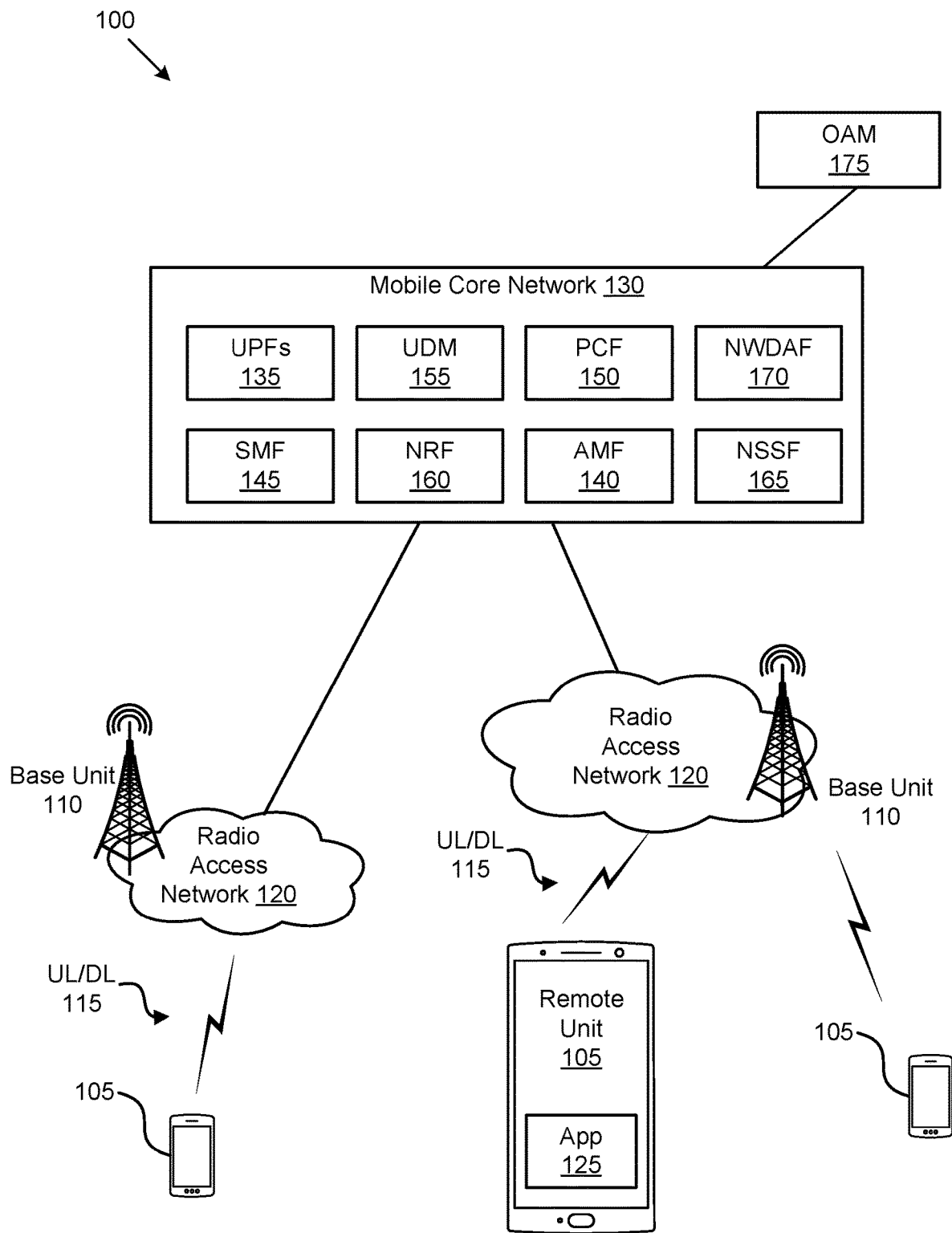
FIG. 1 is a schematic block diagram illustrating a wireless communication system that supports disabling or enabling control loop decisions, according to one or more examples of the present disclosure.

As will be appreciated by one skilled in the art, aspects of the examples may be embodied as a system, apparatus, method, or program product. Accordingly, examples may take the form of an entirely hardware example, an entirely software example (including firmware, resident software, micro-code, etc.) or an example combining software and hardware aspects.

For example, the disclosed examples may be implemented as a hardware circuit comprising custom very-large-scale integration (VLSI) circuits or gate arrays, off-the-shelf semiconductors such as logic chips, transistors, or other discrete components. The disclosed examples may also be implemented in programmable hardware devices such as field-programmable gate arrays, programmable array logic, programmable logic devices, or the like. As another example, the disclosed examples may include one or more physical or logical blocks of executable code which may, for instance, be organized as an object, procedure, or function.

Furthermore, examples may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain example, the storage devices only employ signals for accessing code.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM" or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for examples may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the examples may be combined in any suitable manner. In the following description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Reference throughout this specification to "one example," "an example," or similar language means that a particular feature, structure, or characteristic described in connection with the example is included in at least one example. Thus, appearances of the phrases "in one example," "in an example," and similar language throughout this specification may, but do not necessarily, all refer to the same example, but mean "one or more but not all examples" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B, and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B, and C.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatuses, or other devices to produce a computer implemented process such that the code which executes on the computer or other programmable apparatus provides processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various examples. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements, unless otherwise clear from context.

FIG. 1

FIG. 1 is a schematic block diagram illustrating one example of a wireless communication system 100 that supports disabling or enabling control loop decisions, according to one or more examples of the present disclosure. In one example, the wireless communication system 100 includes at least one remote unit 105, a radio access network (RAN) 120, a mobile core network 130, and an Operation and Maintenance System (OAM) 140.

The RAN 120 and the mobile core network 130 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 130 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3rd Generation Partnership Project (3GPP) specifications. In another implementation, the RAN 120 is compliant with the Long Term Evolution (LTE) system specified in the 3GPP specifications. More generally, however, the wireless communication system 100 may implement some other open or proprietary communication network, for example, WiMAX, among other networks. The present disclosure is not intended to be limited to the implementation of any particular wireless communication system architecture or protocol.

In one example, the remote units 105 may include computing devices, such as desktop computers, laptop computers, personal digital assistants (PDAs), tablet computers, smartphones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some examples, the remote units 105 include wearable devices, such as smartwatches, fitness bands, optical head-mounted displays, or the like. Moreover, the remote units 105 may be referred to as the User Equipment (UE), subscriber units, mobiles, mobile stations, users, terminals, mobile terminals, fixed terminals, subscriber stations, user terminals, wireless transmit/receive unit (WTRU), a device, or by other terminology used in the art.

The remote units 105 may communicate directly with one or more of the base units 110 in the RAN 120 via uplink (UL) and downlink (DL) communication signals. Furthermore, the UL and DL communication signals may be carried over the wireless communication links 115. Here, the RAN 120 is an intermediate network that provides the remote units 105 with access to the mobile core network 140.

The base units 110 may be distributed over a geographic region. In certain examples, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a radio access network (RAN), such as the RAN 120, that may include one or more controllers communicably coupled to one or more corresponding base units 110. These and other elements of the RAN are not illustrated but are well known generally by those having ordinary skill in the art. The base units 110 connect to the mobile core network 130 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110. Note that during NR-U operation, the base unit 110 and the remote unit 105 communicate over unlicensed radio spectrum.

In one or more examples, the mobile core network 130 is a 5G core (5GC) or the evolved packet core (EPC), which may be coupled to a packet data network 150, like the Internet and private data networks, among other data networks. A remote unit 105 may have a subscription or other account with the mobile core network 140. Each mobile core network 130 belongs to a single public land mobile network (PLMN). The present disclosure is not intended to be limited to the implementation of any particular wireless communication system architecture or protocol.

The mobile core network 130 includes several network functions (NFs). As depicted, the mobile core network 130 includes multiple user plane functions (UPFs) 135. The mobile core network 130 also includes multiple control plane functions including, but not limited to, an Access and Mobility Management Function (AMF) 140 that serves the RAN 120, a Session Management Function (SMF) 145, a Policy Control Function (PCF) 150, a Unified Data Management function (UDM) 155, a Network Repository Function (NRF) 160 (used by the various NFs to discover and communicate with each other over APIs), a Network Slice Selection Function (NSSF) 165 that selects a needed set of network slices, or other NFs defined for the 5GC.

In various examples, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. In various examples, the mobile core network 130 includes. In certain examples, the various network slices may include separate instances of network functions, such as the SMF 155 and User Plane Function (UPF) 135. In some examples, the different network slices may share some common network functions, such as the AMF 150. The different network slices are not shown in FIG. 1 for ease of illustration, but their support is assumed.

In certain examples, the mobile core network 130 supports network data analytic functions (NWDAF) 170 that can provide network slice level data analytics (e.g., load level information) to PCF 150 and the NSSF 165. The PCF 150 can use that data in its policy decisions. In some examples, the NWDAF 170 communicates with an Operation and Maintenance System (OAM) 175. In certain examples, the OAM 175 receives a pause point reached notification.

Although specific numbers and types of network functions are depicted in FIG. 1, one of skill in the art will recognize that any number and type of network functions may be included in the mobile core network 130. Moreover, where the mobile core network 130 is an evolved packet core network (EPC), the depicted network functions may be replaced with appropriate EPC entities, such as a mobility management entity (MME), serving gateway (SGW), packet gateway (PGW), home subscriber server (HSS,) and the like. In certain examples, the mobile core network 130 may include an authentication, authorization, accounting (AAA) server.

While FIG. 1 depicts components of a 5G RAN and a 5G core network, the described examples apply to other types of communication networks and Radio Access Technology (RAT), including Institute of Electronic and Electrical Engineers (IEEE) 802.11 variants, Global System for Mobile Communications (GSM), General Packet Radio Service (GPRS), universal mobile telecommunications system (UMTS), LTE variants, code division multiple access (CDMA) 2000, Bluetooth®, ZigBee®, Sigfox®, and the like. For example, in an LTE variant involving an EPC, the AMF 150 may be mapped to an MME, the SMF 155 mapped to a control plane portion of a PGW and/or to an MME, the UPF maps to an SGW and a user plane portion of the PGW, the UDM/unified data repository (UDR) maps to an HSS, etc.

In the following descriptions, the term "gNodeB" (gNB) is used for the base station 110 but it is replaceable by any other radio access node, e.g., RAN node, evolved NodeB (eNB), Base Station (BS), Access Point (AP), New Radio (NR), etc. Further, the operations are described mainly in the context of 5G NR. However, the proposed solutions/methods are also equally applicable to other mobile communication systems supporting network slicing.

Management Domains

Management domains are a collection of resources that have their own management system. A management system is for example any set of management services or their implementations in management functions. Thus, management domains include things such as vendor devices with their own management system, vendor solutions, technical domains such as 3GPP core, 3GPP RAN, cloud domains, data centers, transport networks with their own controllers, operator administrative domains, country domains and so forth.

Figure 2A:
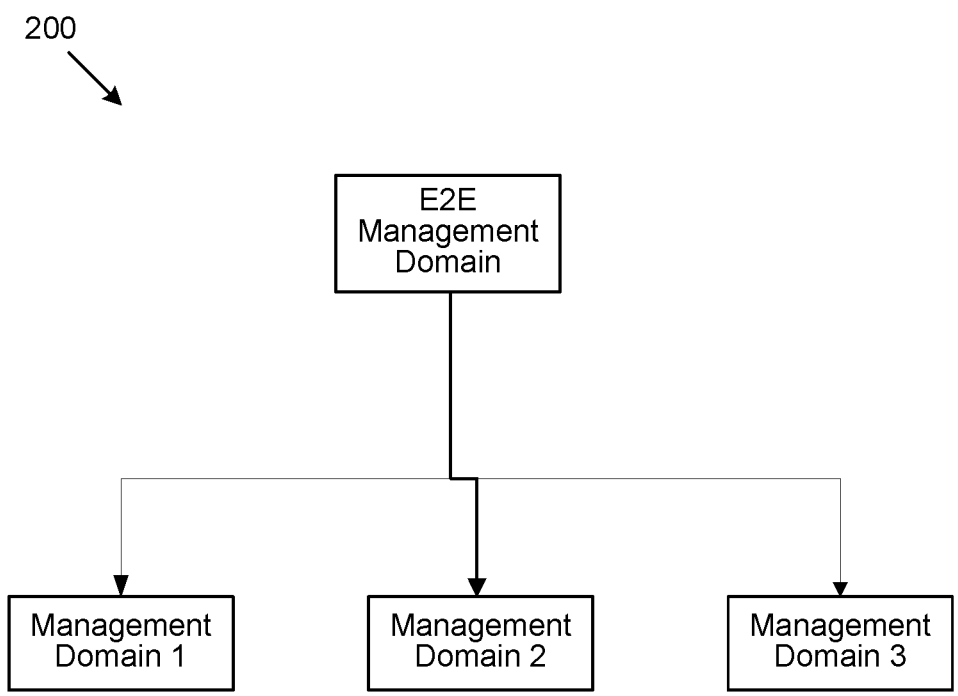
FIG. 2A is a schematic block diagram illustrating a logical representation of management domains, according to one or more examples of the present disclosure.

FIG. 2A is a schematic block diagram illustrating a logical representation 200 of management domains. More specifically, FIG. 2A shows an example of management domains in a logical deployment representation in an operator network. As described in more detail below, in various examples of the present disclosure, one or more control loops (open or closed) may be used to achieve predetermined goals defined by entities (e.g., operator entities) related to the performance of the mobile network components within the management domains/equipment. In some examples, the systems and method disclosed herein improve management service technology by providing the ability to disable or enable certain control loop actions or configurable attribute changes from being performed by specified control loops or entities within the control loops on specified managed entities.

Figure 2B:
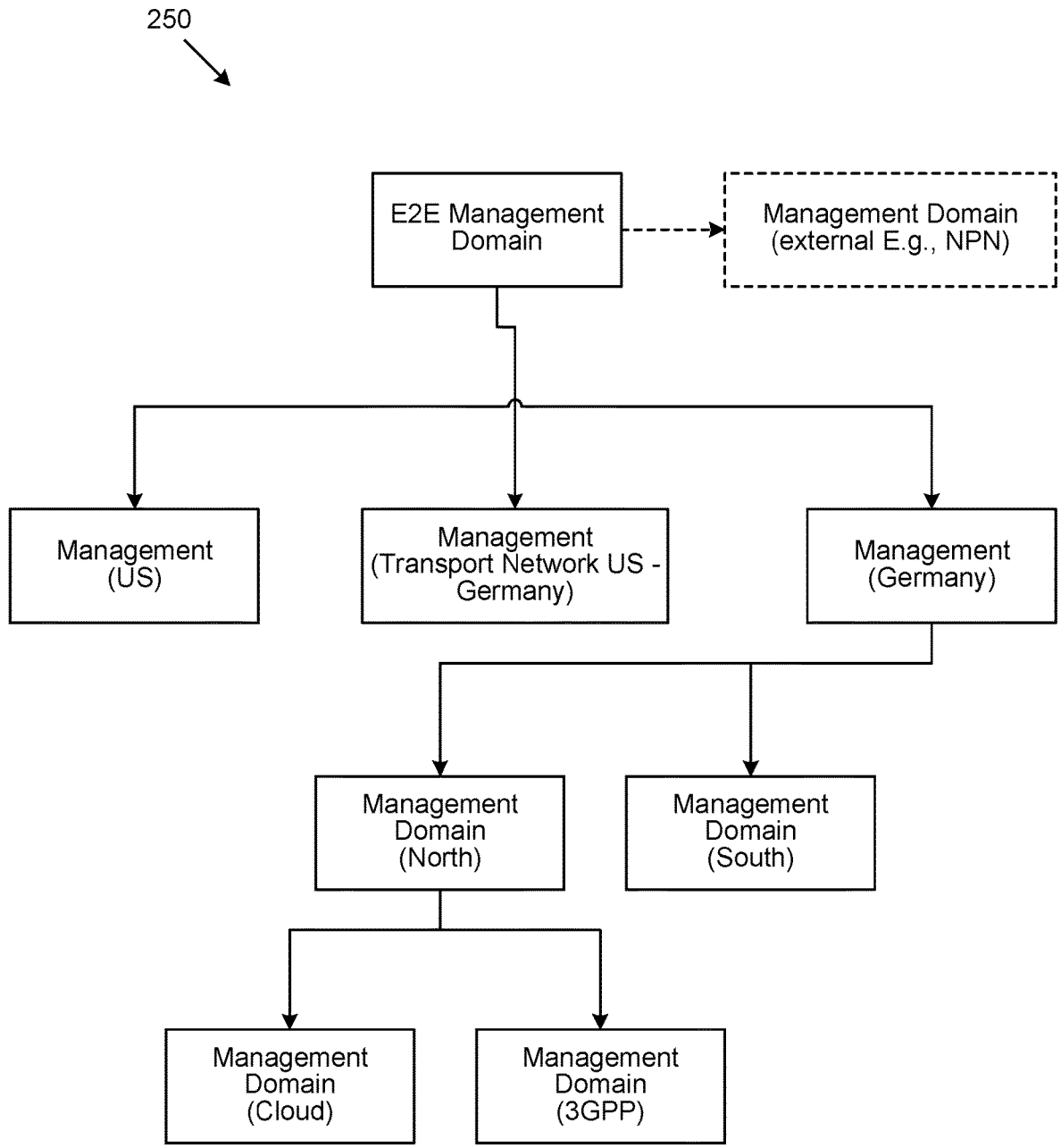
FIG. 2B is a schematic block diagram illustrating an example deployment scenario of management domains, according to one or more examples of the present disclosure.

FIG. 2B is a schematic block diagram illustrating an example deployment scenario 250 of management domains. More specifically, FIG. 2B shows how an example deployment of management domains for an operator that provides service in the US and Germany. Only the German domain is further expanded to show the recursion (e.g., hierarchy) in management domains. FIG. 2A is intended to depict an example deployment scenario of management domains as depicted in the logical representation of FIG. 2A. However, further domains such as vendor-specific management domains/equipment may exist (not shown). As described in more detail below, in some examples of the present disclosure, one or more control loops (open or closed) may be used to achieve predetermined goals defined by entities (e.g., operator entities) related to the performance of the mobile network components within the management domains/equipment. In various examples, the systems and method disclosed herein improve management service technology by providing the ability to disable or enable certain control loop actions or configurable attribute changes from being performed by specified control loops or entities within the control loops on specified managed entities.

Control Loops—Open and Closed

FIG. 3A is a diagram depicting a control loop (CL) which is an open control loop 305 according to one or more examples of the present disclosure. FIG. 3B is a diagram depicting a closed control loop 335 according to one or more examples of the present disclosure. Work in 3GPP Systems Aspects Working Group 5 (3GPP SA5) (TS28.535) and elsewhere defines the two extremes of open and closed control loops—an open control loop 305 as depicted in FIG. 3A and a closed control loop 335 as depicted in FIG. 3B.

An open control loop provides for an operator 310 (also referred to herein as an operator entity) to be a part of or interact with at least one of the stages in the control loop 305. FIG. 3A depicts stages (entities and services) that monitor, analyze, decide, and execute. An observation producer 315 is depicted as providing input (e.g., measurements) to the control loop 305, 335 and the control loop 305, 335 is depicted as providing output, such as, for example, instructions for execution by the controlled entity 330 and/or changes to configurable parameters of the controlled entity 330. A closed control loop 335 provides for the operator 310 to define a goal for the closed control loop 335 and once configured, the closed control loop 335 runs automatically. Both the open control loop 305 and closed control loop 335 attempt to control the status of a managed object (e.g., controlled entity 320) with the objective to keep the managed object as close as possible to an operator-specified desired state. As described in more detail below, the various examples of the methods and entities (e.g., systems and/or apparatuses) of the present disclosure, describe various features that improve open control loops 305 and closed control loops 335, by providing a management service producer to disable or enable decisions from being made by one or more control loops or entities therein for selected a managed entity.

Closed Loop Models

FIG. 3B is a diagram depicting a closed control loop according to one or more examples of the present disclosure. In various examples, there are multiple models of closed loops 335. Some examples of closed loop models include Observe, Orient, Decide, Act (OODA), Monitor, Analyze, Plan, Execute over a shared Knowledgebase (MAPE-K), and so forth. In some examples, the closed control loops 335 are composed of multiple stages. The number of stages in various closed control loops is not necessarily fixed. The multiple stages of the closed control loop 335 primarily involve: (i) observation/monitoring of the system; (ii) analysis of the observed information; (iii) a comparison of the observed information with the desired state; (iv) a decision (e.g., an action plan) is produced of what action to take based on the comparison; and (v) the execution of those decisions. Various stages of closed control loops 335 may exchange information with each other over a knowledge base. However, stages may be skipped, or further stages may be added creating closed loops with any number of stages. Certain stages with particular kinds of observations of the system, and execution of the action decisions based on a comparison of the observations may be mandatory.

Figure 4:
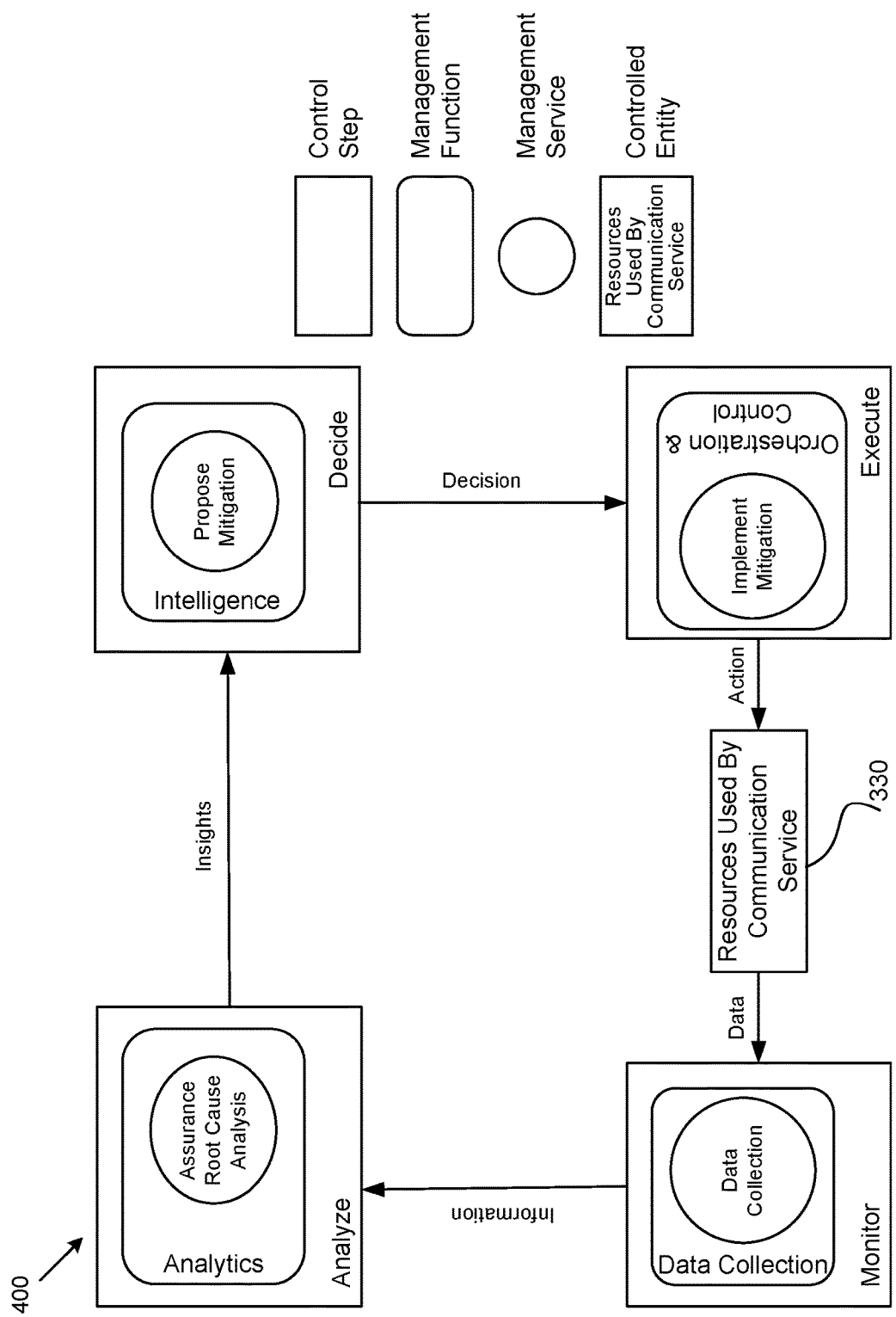
FIG. 4 is a diagram depicting a sequence scenario for disabling or enabling control loop decisions, according to one or more examples of the present disclosure.

FIG. 4 is a diagram depicting a sequence scenario 400 for disabling or enabling control loop decisions, according to one or more examples of the present disclosure.

Information flows in a typical closed control loop as shown in FIG. 4 from TS 28.536 V0.4.0. In FIG. 4, the input to the loop is the data concerning the resources used which is monitored by the control step Monitor. The data maybe be ordered in the data collection and processed information is provided to the analyze and decide phases. The output of the step "Decide" is a decision (also referred to as an action plan). The decisions or action plans are transmitted to the Execute control step (or the execution phase) where management functions implementing management services such as orchestration or resource configuration or provisioning may break down the selected decision into configuration commands to be sent as intended or planned actions to the managed entity (in this case the resources used by the communication service). The decisions (e.g., action plans) relate to the intended consequence that the decision taking management service as part of the control loop would like to achieve.

The systems and methods described herein relate to the decisions after the 'analyze' and 'decide' steps which are sent to the 'execute' step and more specifically to disabling/enabling such decisions. At some level, the difference between decisions and configurations may be subtle. For example: a decision refers to the intention (e.g., objective) that is to be achieved (e.g., as a result of executing the action plan). For example, a decision produced may be to take actions to increase coverage area, whereas a configuration refers to the exact attribute that is to be modified as part of the action plane such as for example: change azimuth angle. Thus, a decision refers to what is to be done (e.g., what objective is to be achieved), and an action/configuration refers to how it is actually implemented or done in a particular situation.

In various examples, it may be beneficial to disable or enable certain decisions from being selected (e.g., produced at the decision stage, consumed at the execute stage, or both) by certain control loops or entities therein. For example, it may be beneficial to disable multiple control loops or entities from determining an overlapping or a potentially conflicting decision such as a decision to take actions to increase coverage area. Disabling selection of decisions/action plans (e.g., by disabling production at the decide stage and/or consumption at the execute stage) may reduce the number of specific actions and/or configurable attributes than would need to be disabled at the execute stage.

Services/Slices Across Multiple Management Domains.

Figure 5:
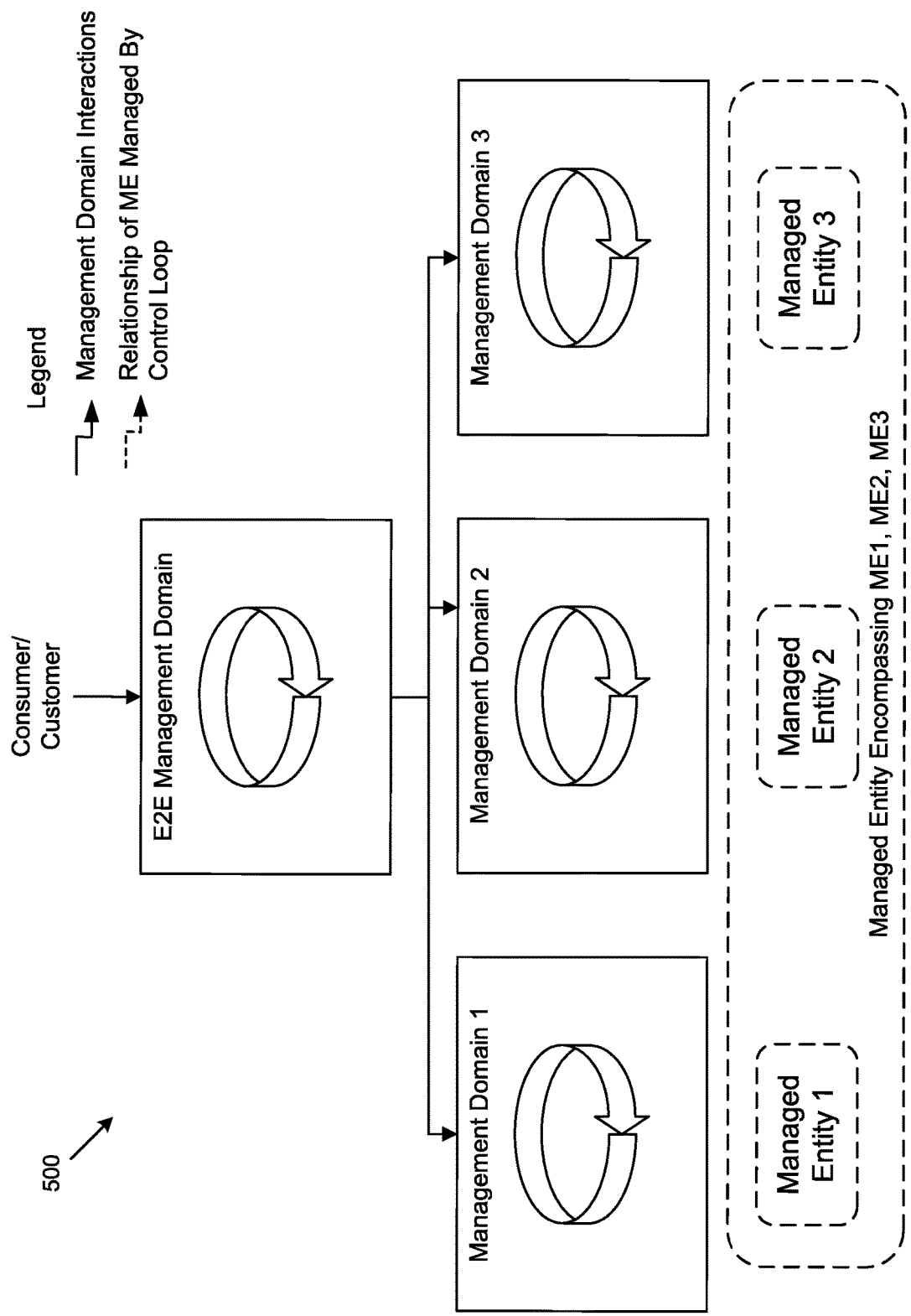
FIG. 5 is a block diagram illustrating the logical architecture 500 of an operator network with multiple domains having one or more control loops, according to one or more examples of the present disclosure.

FIG. 5 is a block diagram illustrating the logical architecture 500 of an operator network with multiple domains having one or more control loops. The E2E management domain (MD) is responsible for managing the E2E Managed Entity. Assume there is one closed control loop in the E2E MD that takes care of ensuring certain aspects (such as for example key performance indicators (KPIs) corresponding to an SLA/SLS of the E2E ME. Within each Management domain, other closed loops take care of the same aspect (KPI) corresponding to a service level agreement (SLA)/service level specification (SLS) of their respective MEs. The E2E ME would like to coordinate the SLA on an E2E level and not on individual domain level as it is conceivable that closed loops in multiple management domains may see the same issue in their respective MEs and take divergent corrective decisions.

For example, two neighboring RAN domains may each have closed loops optimizing the coverage in the respective area. The management functions responsible for deciding the scope of the coverage area could take counterproductive measures for the same issue. Assume that both RAN management domains see a coverage hole in an area and decide to increase the coverage area to cover the hole—thereby causing a coverage overlap and thereby causing interference instead. In such a case, coordination of the decisions taken by the closed loops from a higher-level MD (example the E2E MD) control loop to the RAN control loops is required, which coordination may include, according to one or more examples of the present disclosure, the ability to disable or enable selected decisions (e.g., action plans) from being selected (e.g., produced and/or consumed) by one or more control loop or entities therein (e.g., in this situation for example, certain actions or configurable attributes may be disabled from being executed by two or more control loops or entities in the two neighboring RAN domains.

High-Level Solution

Figure 6:
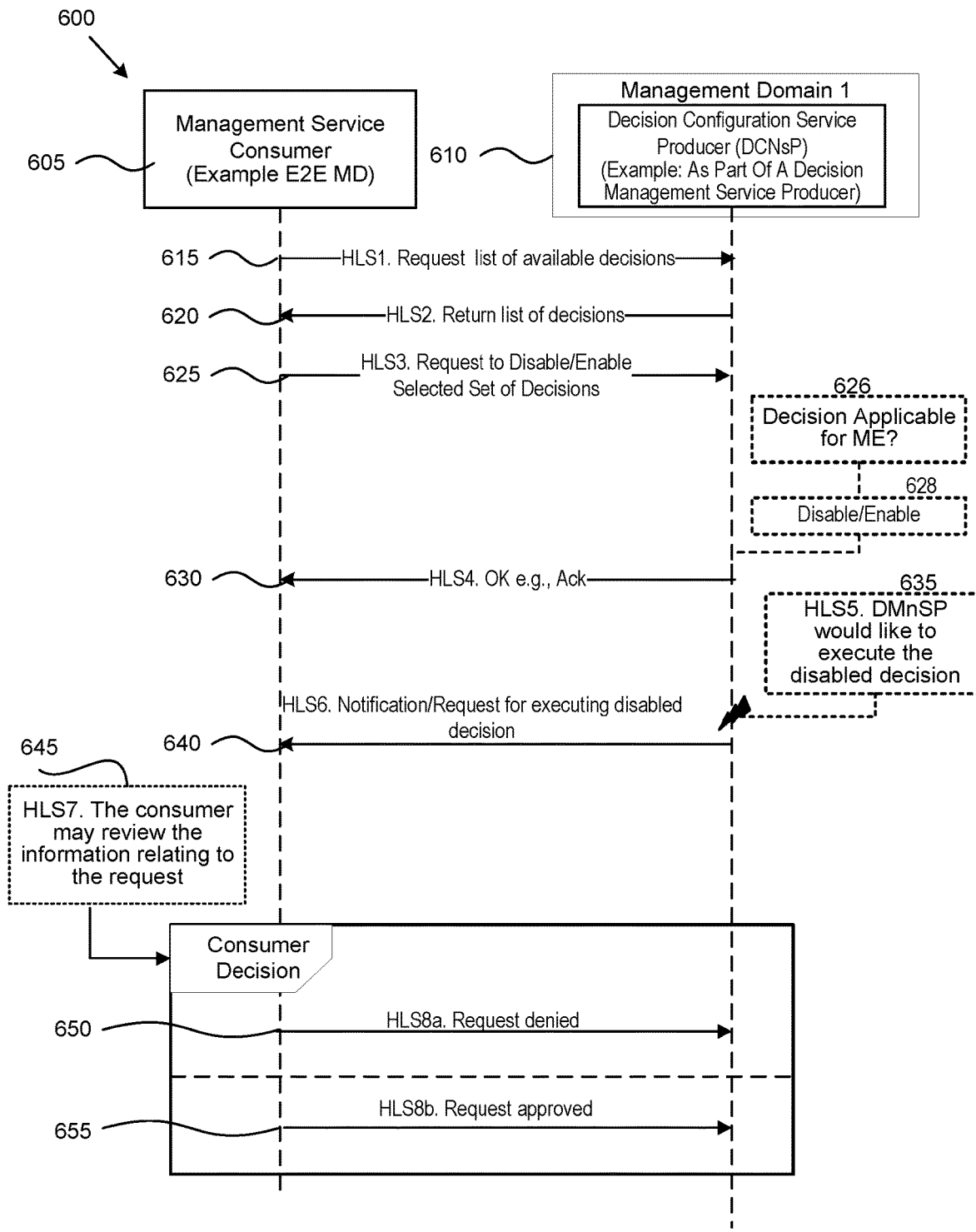
FIG. 6 is a block diagram illustrating a sequence diagram for disabling or enabling a selected set of decisions for a control loop, according to one or more examples of the present disclosure.

FIG. 6 is a diagram depicting a sequence diagram 600 for disabling or enabling control loop decisions, according to one or more examples of the present disclosure.

It may be noted by one of skill in the art that various examples may apply to both open control loops and closed control loops.

A feature and method that enables or disables decisions from the decision phase that a decision-taking management service can perform as part of a control loop. For example, the features in the systems and method disclosed herein may be used to enable an E2E MD control loop (CL) to decisions are responsibility of which management domain CL while the E2E CL is certain that other MDs are not taking any divergent, conflicting, or unnecessary decisions.

This complete set of features proposed and claimed in this disclosure that may be required on vendor equipment/ solutions/management domains that contain control loops include:

Feature 1—Optionally provide the list of possible decisions related to a specific managed entity.

Feature 2—Disable/Enable specific decisions optionally with specific conditions.

Various examples include this feature. Other features support this feature and may, therefore, be optional features.

Feature 3—Optionally specify a condition for disabling/ enabling such decisions.

Feature 4—Optionally provide a notification to the management service consumer (example E2E domain) if the corresponding management service in a management domain would like to execute the disabled decision.

An example method of how this type of high-level solution may be used is shown in the sequence diagram depicted in FIG. 5.

Entities in the Sequence Diagram

The Management Service Consumer (MnSC) 605 refers to any management function, closed-loop, software, or the E2E management domain, Operator, or the operator dashboard. The entity is primarily a software implementation but could also be human interacting via a dashboard or API. In this example, it is shown as external to MD1 but could also exist internally.

The Decision Management Service Producer (DMSP) 610 is an implementation of the new entity in the management domain as claimed by this invention. The features/ capabilities of this new management service can be implemented within other management services' implementation. In this example, it is shown as part of the MD 1 but could also exist externally.

One of skill in the art may note that FIG. 6 shows a single logical entity. However, the sequence depicted in FIG. 5 could also be implemented as a collection of entities.

Steps of the Sequence Diagram

In various examples, one or more steps HSL1 through HSL8b may be performed.

At step HLS1, the MnSC 605 can get 615 (e.g., request) information including a list of decisions that can be recommended or enforced by a DMSP. Examples of decisions include any changes in the behavior of a set of MEs, such as: increasing or decreasing resources of the ME; changing the priorities amongst different MEs; changes in coverage area; changes in requirements for SLA (service level agreement) or SLS (service level specification); changes in QoE of QoS levels (or 5QI levels as in TS23.501); and/or changes in the lifecycle or the states of an ME.

In various examples, the following options may be implemented: the consumer may optionally specify filters related to the list of decisions; and the decisions may be specific to a combination of ME, management function (MF), control loop goal or control loop (Example: All decisions regarding ME1 as part of Closed-loop X1 are disabled).

At step HLS2, the DMSP 610 returns 620 the possible decisions and whether they are disabled or enabled.

At step HLS3, the service consumer 605 provides 625 a set of decisions that it would like to disable (or enable). Examples include: (a) disable the possibility of increasing coverage area for RAN node 1-25; (b) disable the decisions to change handovers over certain Xn interfaces; (c) disable the decisions that that increase handover thresholds; and/or (d) disable all decisions on NSI1 (Network slice instance).

Optionally, conditions for disabling (or enabling) the decisions may be specified. Examples may include: (i) do 3a for 16:00 to 20:00, enable otherwise; (ii) Do 3c if utilization KPI>90%; and/or do 3c except for Management function in closed loop ID X.

At step HLS4, the DMSP 610 provides 630 an acknowledgment of the success or failure of the request.

In various examples, further optional steps may be performed.

At step HLS5, at some point 635 the DMSP 610 would like to request execution of a disabled decision.

At step HLS6, the DMSP 610 sends 640 a notification of the request for a disabled decision to the Service consumer 605 that requested the disabling.

At step HSL7, the Service consumer 605 decides 645 to approve or deny the request.

At step HSL8a, if the Service consumer 605 decides to Deny, a message 650 that the request is denied is communicated.

At step HSL8b, if the Service consumer decides to Approve, a message 655 that the request is approved is communicated. Optionally with an approval, the decision may be enabled, or the condition associated with the disabling (or enabling) may be changed.

An example of a management service specification for DMS which supports this idea is shown in Table 1.

TABLE 1

Example of a management service specification. Each functionality may be specified independently Decision Configuration Management Service

| Provide a list of possible decisions (O) | Provide the possible list of decision associated with A managed entity and/or A management service producer and/or |

TABLE 1-continued

Example of a management service specification. Each
functionality may be specified independently Decision Configuration Management Service

| | |
|---|---|
| | A closed loop and/or<br>A management domain<br>Any combination of the above<br>Additional filters may be specified |
| Enable/Disable a set of decisions (M) | Provides an ability for the service consumer to enable or disable decisions. The decision may be specific to<br>A managed entity and/or<br>A management service producer and/or<br>A closed loop and/or<br>A management domain<br>Any combination of the above<br>optionally the condition in which this request shall be applicable or not applicable may be specified. |
| Approve/Deny Decision (O) | An optional ability to receive approval or denial for decisions |
| Provide a notification for disabled decision requests (O) | A notification to the respective service consumer who disabled the decisions is provided when an execution of the disabled decision is requested. (matching the conditions in the disabling when specified). |

It may be noted by one of skill in the art that these functionalities can be spread over multiple management services specifications and implementations. They are provided here for readability.

Figure 7:
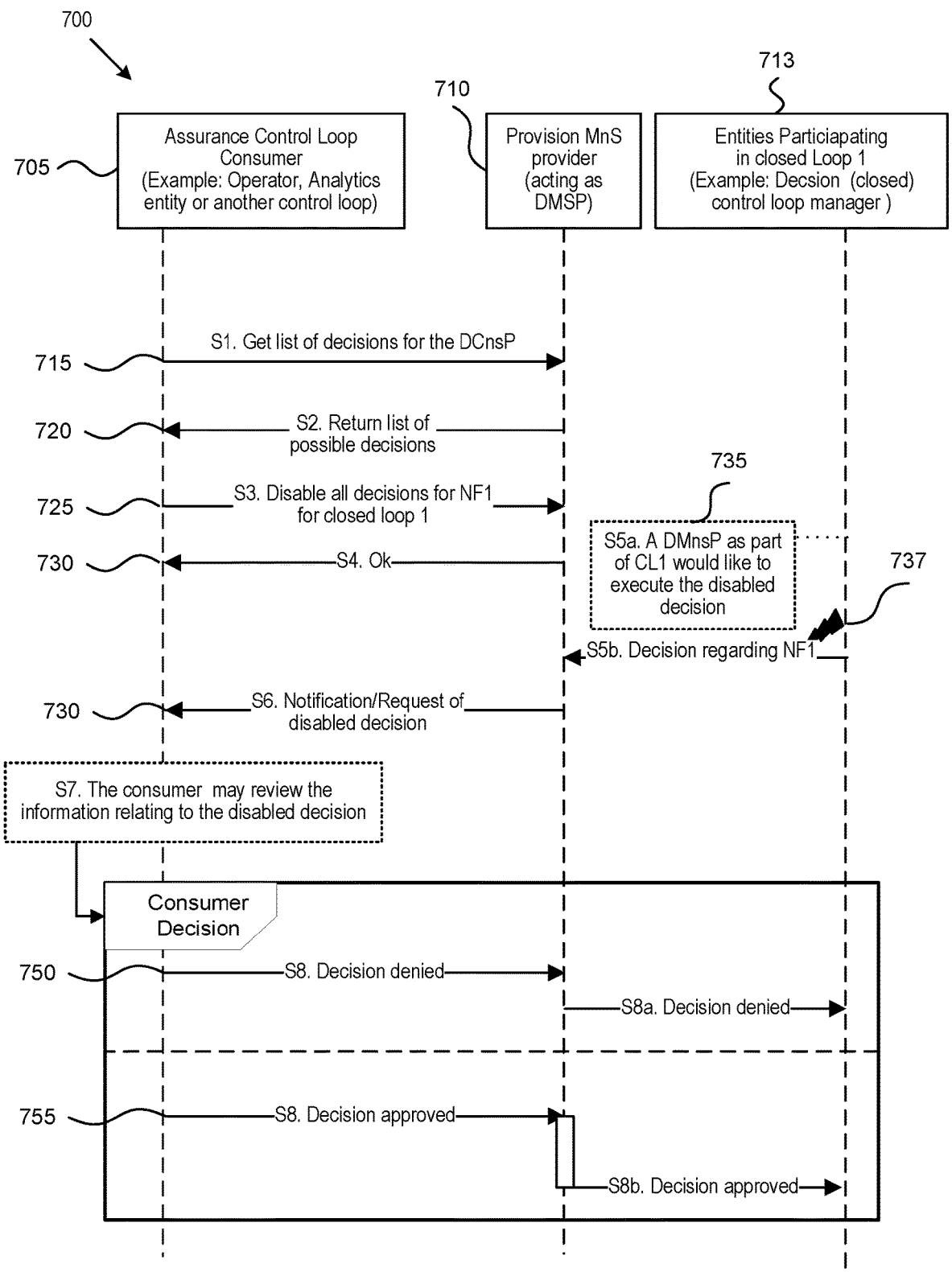
FIG. 7 is a block diagram illustrating a 3GPP SA5-based sequence for disabling a selected set of decisions for a control loop, according to one or more examples of the present disclosure.

FIG. 7 is a block diagram illustrating a 3GPP SA5-based sequence 700 for disabling a selected set of decisions for a control loop, according to one or more examples of the present disclosure. FIG. 7 shows the interaction in a 3GPP management plane. In this example, the DMSP is independently implemented in the management system. The Assurance Control Loop Consumer (ACLC) disable all decisions regarding NF1 for closed loop 1. The DMSP may be any management service producer in the Analysis step and/or the Decision step of FIG. 4.

In the depicted example, the steps of the process include:

S1. The assurance control loop consumer (ACLC, example: Operator or another control loop) gets the list of decisions that can be issued from a management service. This refers to step HLS1 of the high-level solution (FIG. 6). The other option is that this (e.g., the list of decisions) is already known to the consumer (e.g., the ACLC).

S2. The DMSP returns the possible decisions. It may optionally return additional information such as disabled or enabled status of the said decisions the conditions under which they are disabled/enabled.

which other entities they are specific to, for example: specific to a control loop.

S3. The ACLC in this instance requests to disable all configurations of NF id 1 by CL id 1.

S4. Acknowledgment of success or failure.

==============Steps after this are optional==============

S5. (a and b) An entity that is a part of the CL id 1 requests a decision for NF1

S6. The PSP acting as DMSP notifies the ACLC that a request for decision regarding the NF1 was received from an entity part as part of a CL id 1

S7. The ACLC considers the notification and may decide to approve or deny the decision.

S8. (DENY) The ACLC sends a decision denied reply to the DMSP.

The request to the Entity (DMSP) in the CL id 1 is denied by the DMSP.

The DMSP forwards the denial to the respective control loop entitie(s) e.g., Decision control loop manager.

(APPROVE) The ACLC sends a decision approved reply to the DMSP.

The DMSP forwards the approval to the respective control loop entitie(s) e.g., Decision control loop manager.

The DMSP send the decision (e.g., the action plan(s)) to the execution phase producer (e.g., a provisioning service of TS28.531) so that the decision leads to execution of corresponding actions and/or configurations.

Figure 8:
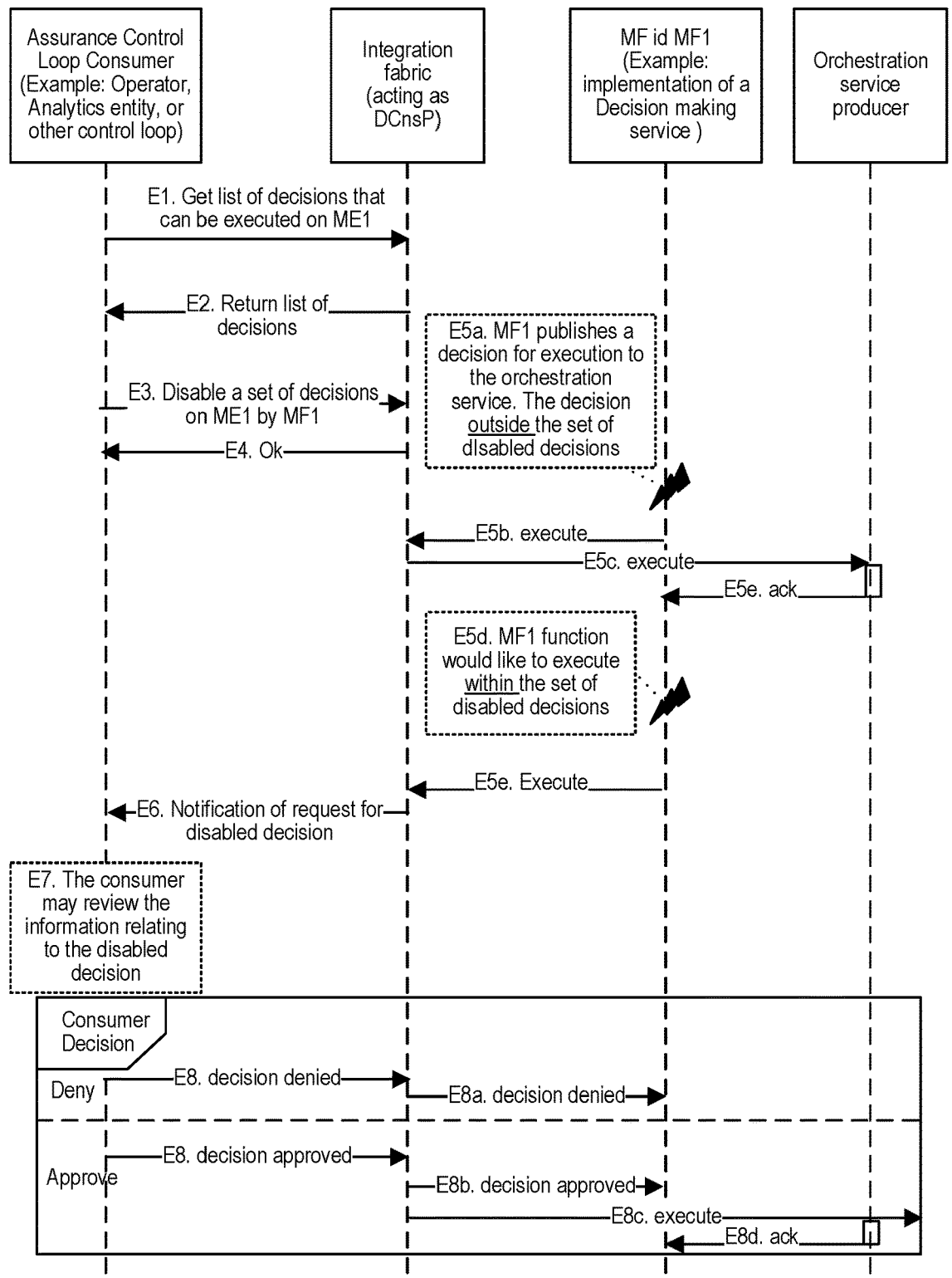
FIG. 8 is a block diagram illustrating an ESTI ZSM-based sequence for disabling a selected set of decisions for a control loop, according to one or more examples of the present disclosure.

FIG. 8 is a block diagram illustrating an ESTI ZSM-based sequence 800 for disabling a selected set of decision for a control loop, according to one or more examples of the present disclosure. An example based on the ZSM framework is shown in FIG. 8. In this example, only a subset of decisions corresponding to a management function (id MF1) are disabled (step E3 in FIG. 8). Therefore, if the MF1 publishes a decision on the integration fabric outside the set disabled decisions (step E5a through E5e of FIG. 8) then the integration fabric forwards the decision for execution to the orchestration service producer (as an example in this case). If the requested decision is within the disabled set (step E5f through E8d) of FIG. 8 then a notification is sent to the ACLC (step E6) and based on the decision of ACLC (step E7 in FIG. 8) the request is approved and sent for execution or denied (steps E8 through E8d).

Figure 9:
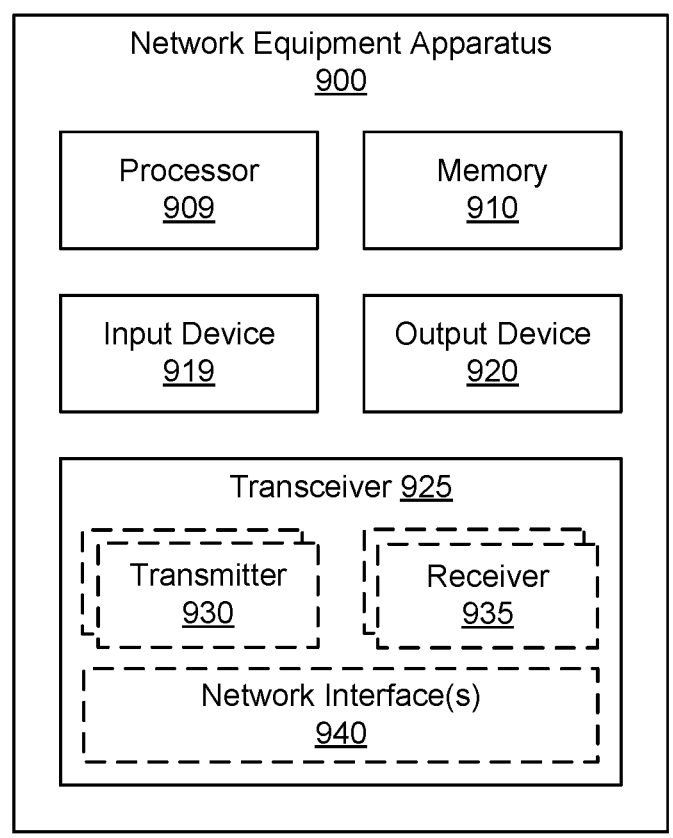
FIG. 9 is a schematic block diagram illustrating a network equipment apparatus that be used in a method and/or system for disabling or enabling control loop decisions.

FIG. 9 depicts a network equipment apparatus 900 that may be used for communications in an operator network, in which one or more operational entities are managed by a control loop that is at least partially automated and for which selected decisions may be disabled or enabled across in response to a request to disable or enable the decisions, the request made across management domains. The network equipment apparatus 900 may be one example of the base unit 110 or RAN node, described above. Furthermore, the base network equipment apparatus 900 may include a processor 905, a memory 910, an input device 915, an output device 920, and a transceiver 925. In some examples, the input device 915 and the output device 920 are combined into a single device, such as a touchscreen. In certain examples, the network equipment apparatus 900 may not include any input device 915 and/or output device 920. In various examples, the network equipment apparatus 900 may include one or more of: the processor 905, the memory 910, and the transceiver 925, and may not include the input device 915 and/or the output device 920.

The processor 905, in one example, may include any known controller capable of executing computer-readable instructions and/or capable of performing logical operations. For example, the processor 905 may be a microcontroller, a microprocessor, a CPU, a GPU, an auxiliary processing unit, a FPGA, or a similar programmable controller. In some examples, the processor 905 executes instructions stored in the memory 910 to perform the methods and routines described herein. The processor 905 is communicatively coupled to the memory 910, the input device 915, the output device 920, and the transceiver 925.

In various examples, the network equipment apparatus 900 is a RAN node (e.g., gNB), as described herein. Here, the processor 905 controls the network equipment apparatus 900 to perform the above-described behaviors.

The memory 910, in one example, is a computer readable storage medium. In some examples, the memory 910 includes volatile computer storage media. For example, the memory 910 may include a RAM, including dynamic RAM (DRAM), synchronous dynamic RAM (SDRAM), and/or static RAM (SRAM). In some examples, the memory 910 includes non-volatile computer storage media. For example, the memory 910 may include a hard disk drive, a flash memory, or any other suitable non-volatile computer storage device. In some examples, the memory 910 includes both volatile and non-volatile computer storage media.

In some examples, the memory 910 stores data related that may be used for communications in an operator network, in which one or more operational entities are managed by a control loop that is at least partially automated and for which selected decisions may be disabled or enabled across in response to a request to disable or enable the decisions, the request made across management domains. For example, memory 910 may store various parameters, configurations, policies, and the like as described above. In certain examples, the memory 910 also stores program code and related data, such as an operating system or other controller algorithms operating on the network equipment apparatus 900.

The input device 915, in one example, may include any known computer input device including a touch panel, a button, a keyboard, a stylus, a microphone, or the like. In some examples, the input device 915 may be integrated with the output device 920, for example, as a touchscreen or similar touch-sensitive display. In some examples, the input device 915 includes a touchscreen such that text may be input using a virtual keyboard displayed on the touchscreen and/or by handwriting on the touchscreen. In some examples, the input device 915 includes two or more different devices, such as a keyboard and a touch panel.

The output device 920, in one example, is designed to output visual, audible, and/or haptic signals. In some examples, the output device 920 includes an electronically controllable display or display device capable of outputting visual data to a user. For example, the output device 920 may include, but is not limited to, an LCD, an LED display, an OLED display, a projector, or a similar display device capable of outputting images, text, or the like to a user. As another, non-limiting, example, the output device 920 may include a wearable display separate from, but communicatively coupled to, the rest of the network equipment apparatus 900, such as a smartwatch, smart glasses, a heads-up display, or the like. Further, the output device 920 may be a component of a smartphone, a personal digital assistant, a television, a tablet computer, a notebook (laptop) computer, a personal computer, a vehicle dashboard, or the like.

In certain examples, the output device 920 includes one or more speakers for producing sound. For example, the output device 920 may produce an audible alert or notification (e.g., a beep or chime). In some examples, the output device 920 includes one or more haptic devices for producing vibrations, motion, or other haptic feedback. In some examples, all or portions of the output device 920 may be integrated with the input device 915. For example, the input device 915 and output device 920 may form a touchscreen or similar touch-sensitive display. In other examples, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the PLMN and/or RAN, as described herein. Although only one transmitter 930 and one receiver 935 are illustrated, the network equipment apparatus 900 may have any suitable number of transmitters 930 and receivers 935. Further, the transmitter(s) 925 and the receiver(s) 930 may be any suitable type of transmitters and receivers.

Figure 10:
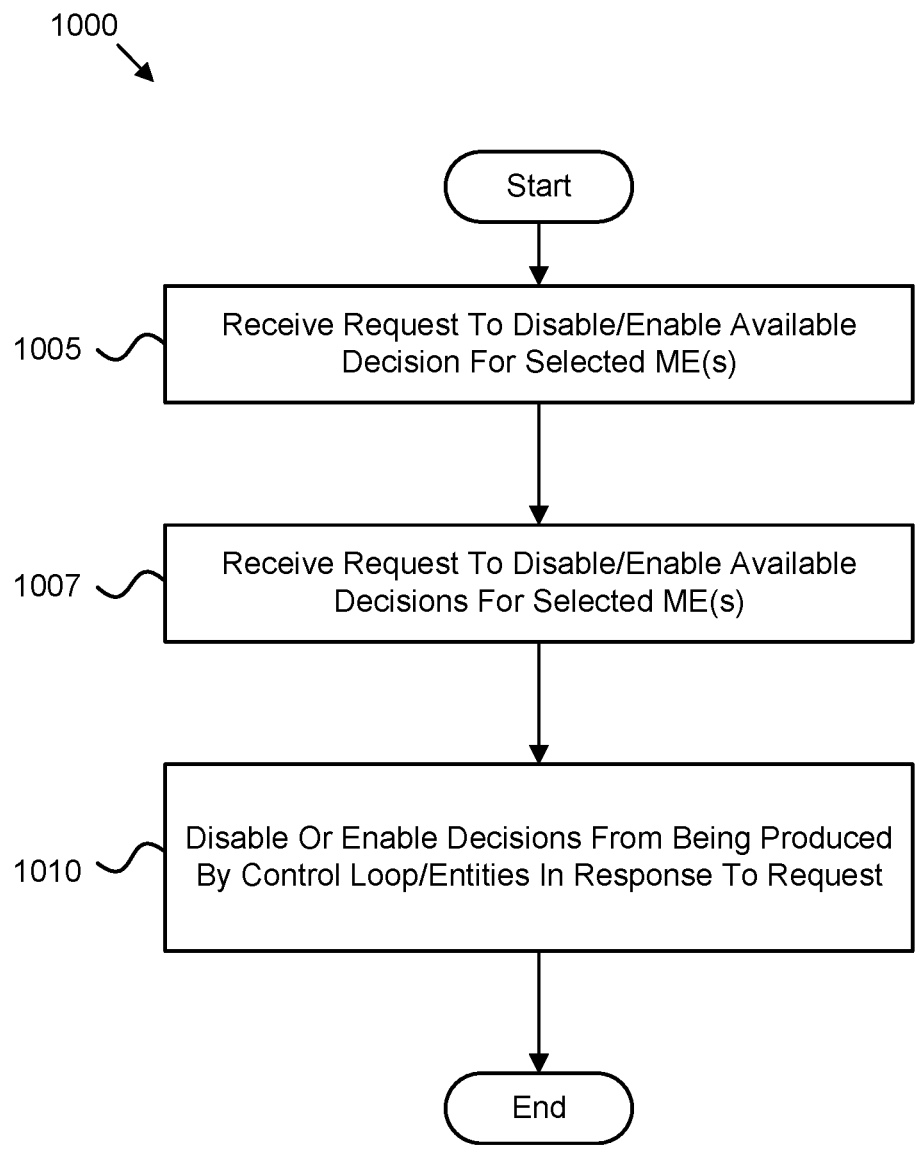
FIG. 10 is a flowchart diagram illustrating a method for disabling or enabling a selected set of decisions for a control loop, according to one or more examples of the present disclosure.

FIG. 10 is a flowchart diagram of a method 1000 for disabling or enabling control loop decisions. One improvement of the methods and systems disclosed herein is the ability to disable (and conversely enable) the execution of certain configurations as part of autonomic control loops (open or closed) and the interface to request the same within a management domain/vendor equipment. On disabling the AMSP is configured to automatically raise a notification with detailed status and relevant information when a request for configuration (that has been previously disabled) is received. This enables the coordination of control loops in which multiple control loops may need to align their actions after the execution phase to avoid interference from each other.

In one or more examples, the method 1000 begins and includes receiving 1005 a request from a consumer of the decision management service producer to disable or enable one or more decisions for one or more managed entities from being selected (e.g., produced/consumed) by the one or more control loops or by one or more entities within the one or more control loops. In various examples the method 1000 further includes determining 1007 whether the request to disable or enable the one or more decisions is currently applicable to the one or more managed entities and is performable by the one or more control loops or entities therein and disabling or enabling 1010 an ability to select the one or more decisions on the one or more managed entities by the one or more control loops or one or more entities within the one or more control loops in response to determining that the request is currently applicable and performable.

In some examples, the method 1000 includes one or more high level solutions steps HLS1 through HLS8*b* described above with respect to FIG. 6. In various examples, the method 1000 includes one or more 3GPP-based steps S1 through S8*b* described above with respect to FIG. 6 and/or one or more network ETSI ZSM-based steps E1 through E8*b* described above with respect to FIG. 7. Furthermore, in various examples, the method 1000 includes selected combinations of steps described above with respect to FIGS. 6, 7, and 8.

In various examples, the method 1000 may be performed by the system 100 depicted above with respect to FIG. 1 and/or other mobile network entities, components, or services.

Examples may be practiced in other specific forms. For example, the following features are disclosed according to one or more examples of the present disclosure:

1. A method for enabling or disabling decisions that can be taken by entities in a closed loop.

2. A management entity providing an interface which may be externally accessible from its management domain to enable requesting any one of: (a) Provide a list of possible decisions (Feature 1, HLS2); (b) Provide an interface to disable/enable those decisions (Feature 2, HLS3); (c) Optionally: provide a specific condition under which the decisions are disabled/enabled (Feature 3, HLS3 optional part); and (d) Provide the ability to notify the DMSP consumer when a disabled decision is requested. (Feature 4, HLS6).

Also disclosed, in one example, is

3. A management entity able to: (a) Get a list of possible decisions specific to various other entities; OR (b) Enable/disable those decisions.

Various features that may implemented in accordance with various examples of the present disclosure may include the following.

A system for disabling or enabling control loop decisions is disclosed that, according to one or more examples of the present disclosure, includes a decision management service producer associated with one or more control loops running in one or more management domains of a mobile network, the decision management service producer including a processor, memory, and program code operable to receive a request from a consumer of the decision management service producer to disable or enable one or more decisions for one or more managed entities from being selected by the one or more control loops or by one or more entities within the one or more control loops. The program code is further operable to determine whether the request to disable or enable the one or more decisions is currently applicable to the one or more managed entities and is performable by the one or more control loops or entities therein and to disable or enable an ability to select the one or more decisions on the one or more managed entities by the one or more control loops or one or more entities within the one or more control loops in response to determining that the request is currently applicable and performable.

In certain examples, in response to an indication that a decision requested by a second control loop of the one or more control loops would conflict with one or more decision selected by a first control loop of the one or more control loops, the decision management service producer disables the ability of the second control loop and/or entities therein to select the indicated decision.

In various examples, an decision management service producer is further configured to communicate control loop decision information in response to a request from the consumer of the decision management service producer, the control loop decision information including a list of one or more managed entities and the one or more decisions corresponding to the respective managed entities that are available for selection by the one or more control loops or entities within the one or more control loops.

In certain examples, the list of available decisions further includes a status indicator that indicates whether a selected decision is currently disabled or enabled. In some examples, decisions are selected from: increasing or decreasing resources of the one or more managed entities; changing priorities amongst the one or more managed entities; changes in coverage area; changes in requirements for a service level agreement (SLA) or a service level specification (SLS); changes in quality of experience levels (QoE), changes in quality of service (QoS) levels, changes in 5G QoS Identifier (5QI) levels; changes in the lifecycle or the states of the one or more managed entities, or other available decisions as documented by Third Generation Partnership Project (3GPP) Systems Aspects Working Group 5 (SA5) or by the European Telecommunications Standards Institute (ETSI) zero-touch network and service management (ZSM) specifications.

In one or more examples, the request for disable or enable the one or more decisions further includes one or more predetermined conditions configured to trigger the disabling or enabling in response to the one or more predetermined conditions being met.

In some examples, the predetermined conditions for disabling or enabling the one or more decisions include logical functions based on parameters selected from timer values, loop counts, time-of-day, key performance indicators, selected management functions, threshold crossings, and mathematical or logical combinations thereof.

In certain examples, the decision management service producer further communicates to the control loop consumer an acknowledgement to indicate whether the request to disable or enable the one or more decisions was successfully performed or not.

In various examples, the decision management service producer further communicates a notification of a request for selecting a disabled decision to the consumer in response to the request or attempt from the one or more control loops or entities therein to select a disabled decision.

In some examples, the decision management service producer further communicates a request for approval to select the disabled decision to the consumer in connection with the notification of the disabled decision.

In certain examples, the system further includes an interface that enables the consumer to provide relevant information for review relating to the disabled decision requested by the one or more control loops or entities therein.

In one or more examples, the decision management service producer further communicates an approval or denial to select the requested disabled decision to a requesting entity in response to receiving a corresponding approval or denial from the consumer for the requested disabled decision to be selected by the one or more control loops or entities therein.

A method for disabling or enabling control loop decisions is disclosed that, according to one or more examples of the present disclosure, includes receiving a request from a consumer of a decision management service producer to disable or enable one or more control loop decisions for one or more managed entities from being selected by one or more control loops or by one or more entities within the one or more control loops. In various examples, the method further includes determining whether the request to disable or enable the one or more decisions is currently applicable to the one or more managed entities and is performable by the one or more control loops or entities therein and disabling or enabling an ability to execute the one or more control loop decisions on the one or more managed entities by the one or more control loops or one or more entity within the one or more control loops in response to determining that the request is currently applicable and performable.

In certain examples, the methods further includes disabling the ability of a second control loop and/or entities therein to select a decision in response to an indication that a decision requested by the second control loop of the one or more control loops would conflict with one or more decisions selected by a first control loop of the one or more control loops.

In various examples, the method further includes communicating control loop decision information in response to a request from the consumer of a decision management service producer, the control loop decision information including a list of one or more managed entities and the one or more decisions corresponding to the respective managed entities that are available for selection by the one or more control loops or entities within the one or more control loops.

In some examples, the list of available decisions further includes a status indicator that indicates whether a selected decision is currently disabled or enabled.

In one or more examples, the decisions are selected from: increasing or decreasing resources of the one or more managed entities; changing priorities amongst the one or more managed entities; changes in coverage area; changes in requirements for a service level agreement (SLA) or a service level specification (SLS); changes in quality of experience levels, changes in QoE of quality of service (QoS) levels or changes in 5G QoS Identifier (5QI) levels; changes in the lifecycle or the states of the one or more managed entities, or other available decisions as documented by Third Generation Partnership Project (3GPP) Systems Aspects Working Group 5 (SA5) or by the European Telecommunications Standards Institute (ETSI) Zero-touch network and Service Management (ZSM) specifications.

In certain examples, the request for disable or enable the one or more decisions further includes one or more predetermined conditions configured to trigger the disabling or enabling in response to the one or more predetermined conditions being met.

In some examples, the predetermined conditions for disabling or enabling the actions and/or changing the attributes include logical functions based on parameters selected from timer values, loop counts, time-of-day, key performance indicators, selected management functions, threshold crossings, and mathematical or logical combinations thereof.

In various examples, the decision management service producer further communicates to the control loop consumer an acknowledgement to indicate whether the request to disable or enable the one or more selected decisions was successfully produced or not.

In one or more examples, the decision management service producer further communicates a notification of a request for executing a disabled decision to the consumer in response to the request or attempt from the one or more control loops or entities therein to select a disabled decision.

In various examples, the decision management service producer further communicates a request for approval to produce the disabled decision and/or to change a condition associated with the disabling or enabling of the decision to the consumer in connection with the notification of the disabled decision.

In some examples, the method further includes enabling the consumer to provide relevant information for review relating to the disabled decision requested by the one or more control loops or entities therein.

In certain examples, the method further includes communicating an approval or denial to produce the requested disabled decision to a requesting entity in response to receiving a corresponding approval or denial from the consumer for the requested disabled decision to be selected by the one or more control loops or entities therein.

The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory coupled to the processor, the processor configured to cause the apparatus to:
receive a request from a consumer of a decision management service producer in one or more management domains of a mobile network to disable or enable one or more decisions for one or more managed entities from being selected by one or more control loops or by one or more entities within the one or more control loops, wherein:
the one or more control loops comprise closed control loops configured to step through stages comprising an analysis stage, a decision stage, an execution stage, and a monitoring stage, and
the one or more decisions comprise action plans selectable to be produced in the decision stage and/or executed as actions in the execution stage of the one or more control loops;
disable or enable an ability to select the one or more decisions on the one or more managed entities by the one or more control loops or one or more entities within the one or more control loops in response to determining that the request is currently applicable and performable; and
disable the ability of a second control loop to select a decision requested by the second control loop in response to an indication that the decision requested would conflict with one or more decisions selected by a first control loop of the one or more control loops.

2. The apparatus of claim 1, wherein the processor is further configured to cause the apparatus to communicate control loop decision information in response to a request from the consumer of a decision management service producer, the control loop decision information comprising a list of available decisions that lists the one or more managed entities and the one or more decisions corresponding to the respective managed entities that are selectable by the one or more control loops or entities within the one or more control loops.

3. The apparatus of claim 2, wherein the list of available decisions further comprises a status indicator that indicates whether a selected decision is currently disabled or enabled.

4. The apparatus of claim 1, wherein the decisions are selected from: increasing or decreasing resources of the one or more managed entities; changing priorities amongst the one or more managed entities; changes in coverage area; changes in requirements for a service level agreement (SLA) or a service level specification (SLS); changes in quality of experience levels, changes in QoE of quality of service (QoS) levels or changes in 5G QoS Identifier (5QI) levels; changes in a lifecycle or a state of the one or more managed entities, other available decisions as documented by Third Generation Partnership Project (3GPP) Systems Aspects Working Group 5 (SA5) or by the European Telecommunications Standards Institute (ETSI) Zero-touch network and Service Management (ZSM) specifications; and combinations thereof.

5. The apparatus of claim 1, wherein the request to disable or enable the one or more decisions further comprises one or more predetermined conditions configured to trigger the disabling or enabling in response to the one or more predetermined conditions being met.

6. The apparatus of claim 5, wherein the predetermined conditions for disabling or enabling the decisions comprise logical functions based on parameters selected from timer values, loop counts, time-of-day, key performance indicators, selected management functions, threshold crossings, and mathematical or logical combinations thereof.

7. The apparatus of claim 1, wherein the decision management service producer further communicates to a control loop consumer an acknowledgement to indicate whether the request to disable or enable the one or more selected decisions was successfully selected or not.

8. The apparatus of claim 1, wherein the decision management service producer further communicates a notification of a request for selecting a disabled decision to the consumer in response to the request or attempt from the one or more control loops or entities therein to select a disabled decision.

9. The apparatus of claim 8, wherein the decision management service producer further communicates a request for approval to select the disabled decision and/or to change a condition associated with the disabling or enabling of the decision to the consumer in connection with the notification of the disabled decision.

10. The apparatus of claim 9, wherein the processor is further configured to cause the apparatus to communicate an approval or denial to select the requested disabled decision to a requesting entity in response to receiving a corresponding approval or denial from the consumer for the requested disabled decision to be selected by the one or more control loops or entities therein.

11. A method comprising:
receiving a request from a consumer of a decision management service producer in one or more management domains of a mobile network to disable or enable one or more decisions for one or more managed entities from being selected by one or more control loops or by one or more entities within the one or more control loops, wherein:
the one or more control loops comprise closed control loops configured to step through stages comprising an analysis stage, a decision stage, an execution stage, and a monitoring stage, and
the one or more decisions comprise action plans selectable to be produced in the decision stage and/or executed as actions in the execution stage of the one or more control loops;
disabling or enabling an ability to select the one or more control loop decisions on the one or more managed entities by the one or more control loops or one or more entities within the one or more control loops in response to determining that the request is currently applicable and performable; and
disabling the ability of a second control loop to select a decision requested by the second control loop in response to an indication that the decision requested would conflict with one or more decisions selected by a first control loop of the one or more control loops.

12. The method of claim 11, further comprising communicating control loop decision information in response to a request from the consumer of a decision management service producer, the control loop decision information comprising a list of available decisions that lists the one or more managed entities and the one or more decisions corresponding to the respective managed entities that are selectable by the one or more control loops or entities within the one or more control loops.

13. The method of claim 12, wherein the list of available decisions further comprises a status indicator that indicates whether a selected decision is currently disabled or enabled.

14. The method of claim 11, wherein the one or more decisions are selected from: increasing or decreasing resources of the one or more managed entities; changing priorities amongst the one or more managed entities; changes in coverage area; changes in requirements for a service level agreement (SLA) or a service level specification (SLS); changes in quality of experience levels, changes in QoE of quality of service (QoS) levels or changes in 5G QoS Identifier (5QI) levels; changes in a lifecycle or a state of the one or more managed entities, other available decisions as documented by Third Generation Partnership Project (3GPP) Systems Aspects Working Group 5 (SA5) or by the European Telecommunications Standards Institute (ETSI) Zero-touch network and Service Management (ZSM) specifications; and combinations thereof.

15. The method of claim 11, wherein the request for disable or enable the one or more decisions further comprises one or more predetermined conditions configured to trigger the disabling or enabling in response to the one or more predetermined conditions being met.

16. The method of claim 15, wherein the predetermined conditions for disabling or enabling the decisions comprise logical functions based on parameters selected from timer values, loop counts, time-of-day, key performance indicators, selected management functions, threshold crossings, and mathematical or logical combinations thereof.

17. The method of claim 11, wherein the decision management service producer further communicates a notification of a request for selecting a disabled decision to the consumer in response to the request or attempt from the one or more control loops or entities therein to select a disabled decision.

18. The method of claim 17, wherein the decision management service producer further communicates a request for approval to select the disabled decision and/or to change a condition associated with the disabling or enabling of the decision to the consumer in connection with the notification of the disabled decision.

19. The method of claim 17, further comprising communicating an approval or denial to select the requested disabled decision to a requesting entity in response to receiving a corresponding approval or denial from the consumer for the requested disabled decision to be selected by the one or more control loops or entities therein.

20. A system comprising a decision management service producer associated with one or more control loops running in one or more management domains of a mobile network, the decision management service producer comprising a processor, memory, and program code operable to:
receive a request from a consumer of a decision management service producer in one or more management domains of a mobile network to disable or enable one or more decisions for one or more managed entities from being selected by one or more control loops or by one or more entities within the one or more control loops, wherein:

the one or more control loops comprise closed control loops configured to step through stages comprising an analysis stage, a decision stage, an execution stage, and a monitoring stage, and the one or more decisions comprise action plans selectable to be produced in the decision stage and/or executed as actions in the execution stage of the one or more control loops;

disable or enable an ability to select the one or more decisions on the one or more managed entities by the one or more control loops or one or more entities within the one or more control loops in response to determining that the request is currently applicable and performable; and disable the ability of a second control loop to select a decision requested by the second control loop in response to an indication that the decision requested would conflict with one or more decisions selected by a first control loop of the one or more control loops.

* * * * *